FIP8212 XR 2,568,543

Sept. 18, 1951 A. N. GOLDSMITH 2,568,543

AUTOMATIC REGISTRATION OF COMPONENT COLOR IMAGES

Filed Aug. 3, 1949 2 Sheets-Sheet 1

INVENTOR
Alfred N. Goldsmith
BY
Philip G. Cooper
ATTORNEY

CROSS REFERENCE EXAMI

INVENTOR
Alfred N. Goldsmith
BY Philip Cooper
ATTORNEY

Patented Sept. 18, 1951

2,568,543

UNITED STATES PATENT OFFICE 2,568,543

AUTOMATIC REGISTRATION OF COMPONENT COLOR IMAGES

Alfred N. Goldsmith, New York, N. Y., assignor to Radio Corporation of America, a corporation of Delaware Application August 3, 1949, Serial No. 108,357

5 Claims. (Cl. 178—5.4)

This invention relates to the automatic registration of component color images such as those involved in the formation and maintenance of a color television picture. It has for its primary purpose the provision of an improved system and method of operation whereby the component color images comprised in a color television picture are automatically maintained in registration so that they are of the same size and are centered at the same point.

The present invention is similar in some respects to that disclosed by my Patent 2,307,212. In accordance with the invention disclosed by the aforesaid patent, there are provided spaced probes or conductors which are so mounted within the picture reproducer tube as to have their extremities slightly out side the electron beam positions corresponding to the normal and visible picture range on the fluorescent screen of the tube. Under these conditions, a deviation or shift of the picture from its normal position produces a potential difference between the probes located at opposite sides of the picture, this potential difference being due to the differential impingement of the cathode ray beam on such conductors or probes. This potential difference is utilized to provide a variable bias potential which functions to control the deflection of the electron beam so that it is maintained in a position where it impinges equally on the oppositely disposed probes and the reproduced picture is maintained in a desired or normal position on the fluorescent screen.

The present invention differs from that of the aforesaid patent in that it is directed to the problem of maintaining in registry the component-color or pimary-color images which enter into the composition of a color television picture. To this end, the probes are made color-selective and are so interconnected as to center the component-color images at the same boundary on the viewing screen and thus to maintain them of the same size. Thus, for centering and registering the component-color images at a common boundary, the color-sensitive probes are disposed at opposite edges of the screen or image area and are interconnected in the same manner as the electrostatic probes of the aforesaid patent. For maintaining exact registry between the edges of the different images, a plurality of probes, each sensitive to a different one of the color components, are located at each edge of the screen and are so interconnected as to maintain the edges of the differently colored images in alignment with one another.

The circuit interconnecting the different pairs of picture centering and picture registering probes may be like that described in the aforesaid patent. As will appear, this is essentially a circuit which functions to apply to the deflectors of the viewing tube a bias potential which is dependent on unequal travel of the electron beam along the probes of an interconnected pair of probes.

The invention will be better understood from the following description considered in connection with the accompanying drawing and its scope is indicated by the appended claims.

Referring to the drawing.

Figures 1, 2, 3, 4, 5:
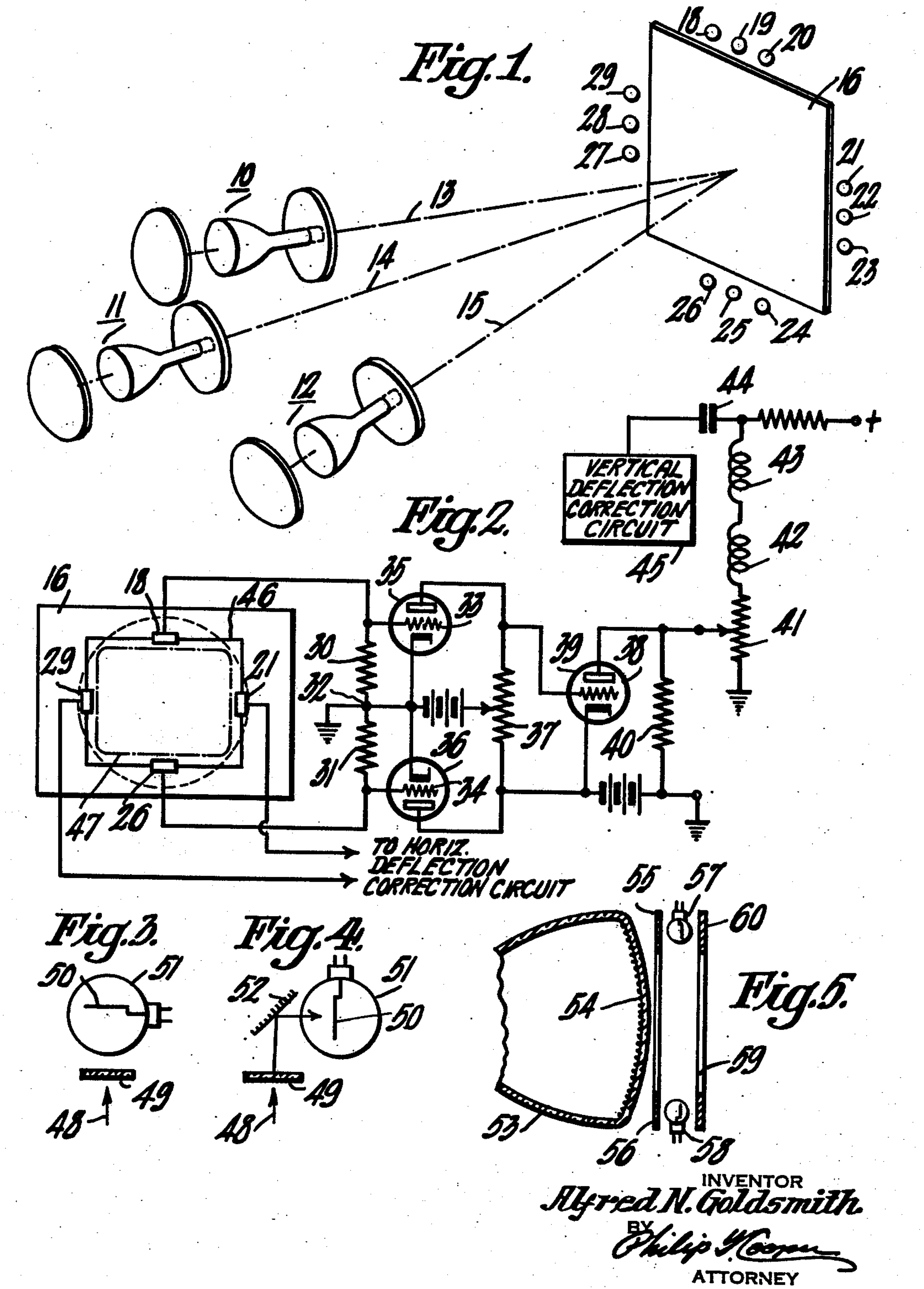
Figure 1 is a perspective drawing indicating the relation between the various parts of a color picture reproducer arranged to apply three cathode rays to the same viewing screen.
Figure 2 is a wiring diagram of the circuit interconnecting the different pairs of probes.
Figures 3 and 4 illustrate different arrangements of the color-sensitive probes.
Figures 5 and 6 illustrate the arrangement of these probes with respect to the screen of the viewing tube.

Figure 1 shows three component-color image producing elements 10, 11 and 12. These elements may be projection kinescopes which (1) are similar to that disclosed by Landis Patent 2,273,801 and (2) are associated with suitable filtering means for producing the differently colored images. Since these kinescopes are of importance in connection with the present invention only in that they function to produce the images which are to be centered and registered, they are not described in detail.

The light beams having optical axes 13, 14 and 15 developed by these elements are projected to a screen 16. Along the edges of the screen and masked from the view of the observer of the picture are mounted a plurality of photoelectric probes 18 to 29. By the term "photoelectric probe" is meant a light-responsive device the output of which depends upon the extent to which the edge of a television picture overlaps the effective luminous entry to the photoelectric probe system. Thus the output current of each of the photoelectric probes 18 to 29 is determined by the extent to which the reproduced picture overlaps the probe. By the use of corresponding component-color filters, the probes 18 to 29 are made to be color selective.

Assuming that the red component-color imarge is produced by the beam 13 and that it is centered in response to currents developed between the probes 18 and 26 and between the probes 29 and 21, all these probes are made sensitive to red light. Similarly the probes 19, 25, 28 and 29 are made sensitive to green light for centering the image produced by the beam 14 by which the green component-color image is produced, and the probes 20, 23, 24 and 27 are made sensitive to blue light for centering the image produced by the beam 15 by which the blue component color image is produced.

Figure 2 shows the connections between the probes 18 and 26 by which the image formed by beam 13 is centered along the vertical dimension of the screen 16. The circuit interconnecting the probes 29 and 21 by which the beam 13 is centered along the horizontal dimension of the screen 16 is similar to that interconnectiong the probes 18 and 26. The same is true of the circuits interconnecting the probes 19 and 25, 28 and 22, 20 and 24, and 27 and 23. Thus for centering each beam and its correspongingly formed image there are provided four probes and two circuits each connected between a different pair of the probes.

As indicated by Figure 2, the probes 18 and 26 are interconnected through resistors 30 and 31 which are grounded at their common terminal 32 and have their ungrounded terminals connected respectively to the grids 33 and 34 of the tubes 35 and 36. With these connections, equal and opposed currens are delivered from the tubes 35 and 36 to a resistor 37 when the picture edges overlap the probes 18 and 26 by equal amounts. When the overlaps are unequal, however, the voltage drops across the resistors 30 and 31 are unequal, the output of one of the tubes 33 and 34 predominates over that of the other and there is produced a resultant potential which is applied to the grid 38 of a triode 39.

The polarity of this resultant potential is dependent on which of the probes 18 or 26 is overlapped the most by the picture. As a result, the output voltage made available at the terminals of a resistor 40 increases when overlap at one of the probes predominates and decreases when overlap at the other probe predominates.

The resistor 40 is connected to a potentiometer 41 which is grounded at one end has its other end connected through choke coils 42 and 43 and a capacitor 44 to the vertical deflection correction circuit 45. The voltage across the resistor 40 thus serves to provide in the vertical deflection circuit a bias potential whereby the picture is moved to a position such that it overlaps the probes 18 and 26 by equal amounts.

In connection with Figure 2, it should be noted that the edges of the reproduced picture are outlined by the full line 46 and the part of the picture visible to the observer is outlined by the broken line 47. With this arrangement, the probes are covered by a mask so that they are not visible.

Figure 3 indicates the details of a photoelectric probe having color discrimination. In this figure the path of the light from the edge of the picture is indicated by an arrow 48. This light passes through a color filter 49 to the photosensitive surface 50 of a photocell 51. As previously indicated, the extent to which the edge of the picture overlaps the photo-sensitive surface 50 determines the output of the photocell.

The photoelectric probe of Figure 4 differs from that of Figure 3 in that it includes a reflector 52 which permits the filter 49 to be disposed in a different angular relation to the photosensitive surface 50. This form of probe is advantageous in cases where it is desired to throw the light outward away from the edge of the picture before striking the photocell. Other optical arrangements may be used to enable any convenient location of the photosensitive surface 50.

Figure 5 shows part of a picture reproducer or kinescope 53 havinging a fluorescent screen 54 on which the color picture is reproduced sequentially or simultaneously. Light from the edges of the screen passes through filters 55 and 56 to the photocells 57 and 58 which are interconnected by a circuit similar to that of Figure 2. The reproduced picture is viewed through the aperture 59 of the mask 60 which hides the probes from the view of the observer.

Figure 6:
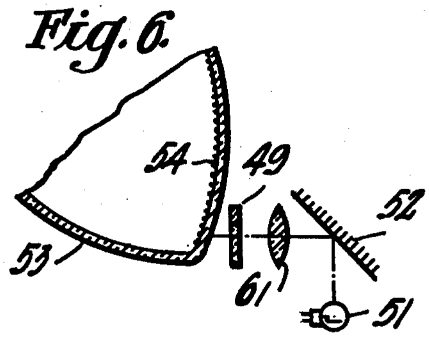

Figure 6 shows an arrangement similar to that of Figure 4, with the exception that it includes a lens 61 which focuses light from the picture approximately or sharply on the light sensitive surface of the photocell 51. The use of the lens 61 permits more light to be transferred from the picture to the photocell and insures better functioning of the probe.

Figure 7:
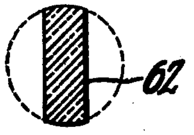
Figure 7 shows a form of lens or equivalent optical system which may form a part of the color-sensitive probe.

Figure 7 illustrates a form of lens 62 having an area somewhat smaller than that of the lens 61 of Figure 6. In this case, a circular convex lens is reduced in size by cutting through it along lines parallel to and equidistant from a diameter thereof, thus reducing it to a form such that it can be readily mounted over the narrow filter 48 of Figure 4.

Figure 8:
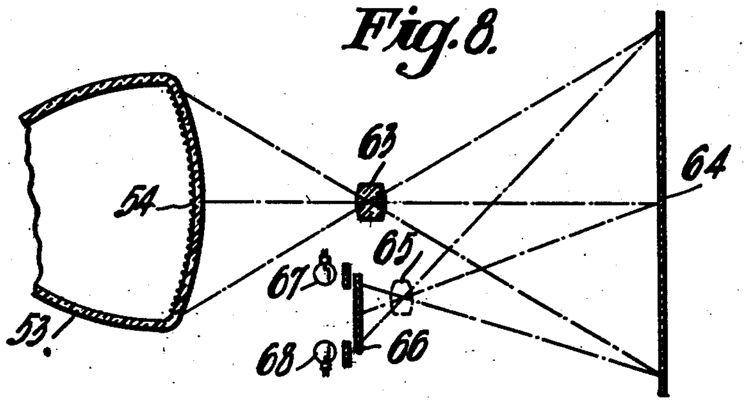
Figure 8 illustrates the use of the invention in the case where the image appearing at the screen of the viewing tube is projected on a viewing screen.

Figure 8 shows one method of applying the automatic registration system of the present invention to a television system of the projection type. Thus the picture image produced on the screen 54 of the kinescope 53 is projected through a lens or equivalent projection system 63 to a translucent or opaque screen 64. A lens 65 focuses some of the light from the screen 64 on an auxiliary screen 66 behind which are located the probes 67 and 68. Alternatively the screen 66 may be omitted and the aerial image at the location of the screen 66 may be utilized to control energization of the probes. In either case, a derived image is utilized for control of the automatic registration system. It is possible, of course, to mount the probes at the edges of the enlarged picture produced on the screen 64, in which case the relation is similar to that between the probes and the fluorescent screen of the kinescope.

Figure 9:
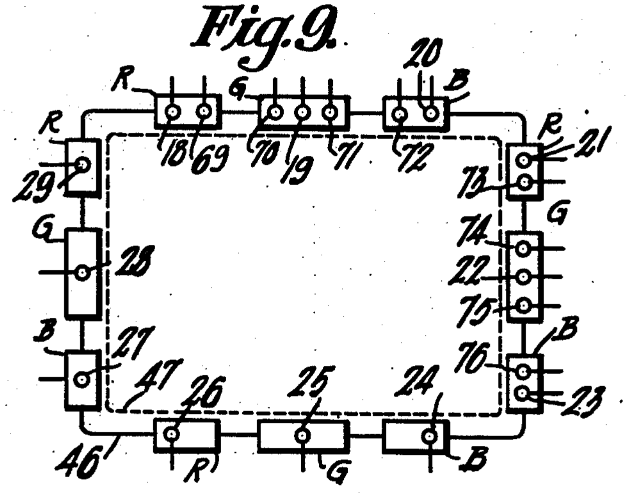
Figure 9 illustrates the arrangement of all the probes required to effect centering and registry of three different component-color images.

Up to this point, the photoelectric probes have been considered mainly as functioning to center the component-color images on the viewing screen of a kinescope or on a projection screen. The manner in which they function to register the edges of such images is now to be considered in connection with Figure 9.

In this figure, the image centering probes 18 to 29 are indicated by the same reference numerals as in Figure 1. In addition to these image centering probes, additional probes are provided for maintaining the edges of the differently colored images in registry with one another. Thus additional probes 69 to 71 are provided for maintaining the images in vertical registration and probes 73 to 76 are provided for maintaining horizontal registration of the images. The various light filters are indicated by rectangles each surrounding a different probe or group of probes and the color of each filter is indicated by a letter R for red, G for green, or B for blue.

The interconnections of the image centering probes and the manner in which they function has been explained in connection with Figures 1 and 2. The operation of the edge registering probes is similar to that of the centering probes with the exception that the interconnection of Figure 2 is between probes which (1) are located at the same side of the screen and (2) respond to the differently colored images.

Thus the probe 69 is connected through the circuit of Figure 2 to the probe 70 and there is a similar connection between probes 71 and 72, between probes 73 and 74, and between probes 75 and 76. It will be noted that the probe 69 is illuminated through a red filter and that the probe 70 is illuminated through a green filter. As a result, any unequal overlap of the red and green images on the respective probes results in a potential which functions, as explained in connection with Figure 2, to bring the horizontal edges of the red and green images in alignment with one another so that the value of this potential is reduced to a minimum. The interaction between probes 71 and 72, between probes 73 and 74, and between probes 75 and 76 is similar to that between the probes 69 and 70 and need not be described in detail.

It is desirable that the time constant for action of the control associated with the probes 69 and 70 shall be different from that of the probes 71 and 72. For example, the former may be more rapid than the latter so that the green picture may be automatically adjusted to equality of size to the red picture before the control of the relative size of the green and blue pictures becomes effective. Thus interaction between the systems and "hunting" may be avoided.

Figure 10:
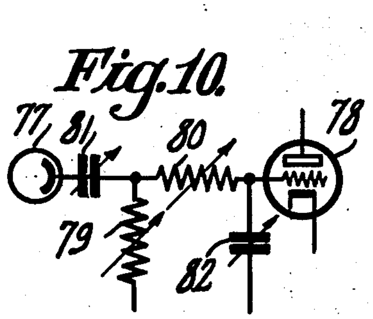
Figure 10 illustrates a circuit for timing the action of certain of the probe circuits.

A connection by which such difference in the timing of the action of the two circuits may be produced is shown in Figure 10. In this figure, the photocell 77 corresponds to one of the probes, the triode 78 corresponds to the triode 35 or 36 of Figure 2, and the resistors 79 and 80 and capacitors 81 and 82 are adjusted to provide the desired timing of the action.

In order to make clear the procedure in using the methods of this invention, the following may be regarded as instructions for adjusting the photoelectric registration controls of such a system.

*Step 1.*—Disconnect the photoelectric controls, preferably maintaining all amplifier tubes burning so that the system remains warm and in normal operating condition.

*Step 2.*—Using the usual centering controls on the respective kinescopes producing the red, green and blue pictures, bring the centers of the three pictures into accurate registration. The remainder of the pictures may or may not be registered depending upon their equality or inequality in size.

*Step 3.*—Using the normal size controls (deflection controls) on the three kinescopes producing respectively the red, green and blue pictures, make these three pictures slightly larger than the mask-aperture size, and also make all three pictures of the same size. The three pictures will now be in accurate momentary registration but the automatic photoelectric control is not active. In order to judge edge overlaps, a group of small slits beyond the edge of the mask may be automatically unmasked by mechanical means not herein shown to enable the corresponding picture edge area to be viewed during the adjustment perior, after which the apertures in question may be closed.

*Step 4.*—Switch into action the photoelectric control (which is associated with the photoelectric probes). The pictures may now be out of registry to some slight extent.

*Step 5.*—Bring the pictures back to center registration by slightly readjusting the controls associated with two of the photoelectric probes, for example, the green and blue vertical and horizontal centering probe controls.

*Step 6.*—Bring the picture back to final registration with the photoelectric controls active by adjusting the vertical and horizontal green and blue probe size controls to register the corresponding green and blue pictures against the red picture, so that all pictures will be of the same size.

The entire system should now remain in automatic registration. It should also be noted that the preceding steps will frequently be unnecessary once the system has been set by preliminary adjustment thereof. Once this has been done, it is anticipated that merely turning on the set will, for a period of many months at least, bring the automatic centering and size controls into operation with the avoidance of any necessity for further readjustment.

It would be desirable if the transmitting station sending out color pictures provided a narrow rim of full-intensity color running around the entire image. This rim should be so narrow that it would not be visible within the picture mask, but would be available as a source of a "standardized image" for the color selective photocell probes. This could readily be done by having white video modulation, that is, minimum antenna current, at the left and right edges, and at the top and bottom edges of the picture, and for a small distance only (e. g., a few picture elements). On the color screen, such a rim would reproduce as white, but would actually consist of superimposed red, green, and blue rims. Each of these component-color rims would thus be available for control purposes, thus ensuring the presence of a control color on all edges of the transmitted picture. This would also be desirable from the general transmission viewpoint since it would rim the picture in white (or bright gray) and thus give a pleasant appearance if the rim were shown.

What the invention provides is an improved system and method of operation for centering the differently colored images of a color television picture and for maintaining the registration of the edges of said images.

I claim as my invention:

1. In a system for controlling the positions of a plurality of component-color picture images produced on a viewing screen by different kinescope elements in each of which elements a cathode ray is modulated to control the brightness of a different one of said images and is made to scan said screen, the combination of a plurality of photoelectric probes each selectively sensitive to a different one of said component colors and all mounted at corresponding edges of said images, means connected between said probes for producing potentials dependent on unequal overlap of said images on said probes, and means responsive to said potentials for registering said edges.

2. In a system for controlling the positions of a plurality of component-color picture images produced on a viewing screen by different kinescope elements in each of which elements a cathode ray is modulated to cotnrol the brightness of a different one of said images and is made to scan said kinescope screen, the combination of a plurality of photoelectric probes mounted at the periphery of said images and including a first pair of probes selectively sensitive to the same one of said component colors and a second pair of probes each selectively sensitive to a different one of said component colors, means connected between the probes of said pairs for producing first and second potentials dependent on unequal overlap of said images on said pairs, and means responsive to said potentials for maintaining said images in registration with one another.

3. In a system for controlling the positions of a plurality of component-color picture images produced on a viewing screen by different kinescope elements in each of which elements a cathode ray is modulated to control the brightness of a different one of said images and is made to scan said screen, the combination of a first pair of photoelectric probes mounted at the same edges of said images and sensitive respectively to the first and the second of said component colors, a second pair of photoelectric probes mounted at the same edges as said first pair and sensitive respectively to the second and the third of said component colors, means connected between said first pair of probes for producing a first potential dependent on unequal overlap of the first and the second of said images on the probes of said first pair, means connected between said second pair of probes for producing a second potential dependent on unequal overlap of the second and the third of said images on the probes of said second pair, and means responsive to said potentials for registering said edges.

4. In a system for controlling the positions of a plurality of component-color picture images produced on a viewing screen by different kinescope elements in each of which elements a cathode ray is modulated to control the brightness of a different one of said images and is made to scan said screen, the combiantion of a first pair of photoelectric probes mounted at the same edges of said images and sensitive respectively to the first and the second of said component colors, a second pair of photoelectric probes mounted at the same edges as said first pair and sensitive respectively to the second and the third of said component colors, means connected between asid first pair of probes for producing a first potential dependent on unequal overlap of the first and the second of said images on the probes of said first pair, means connected between said second pair of probes for producing a second potential dependent on unequal overlap of the second and third of said images on the probes of said second pair, and means responsive to said potentials for registering the edges of said first and second images and thereafter registering the edges of said second and third images.

5. In a system for controlling the positions of a plurality of component-color picture images produced on a viewing screen by different kinescope elements in each of which elements a cathode ray is modulated to control the brightness of a different one of said images and is made to scan said screen, the combination of a pair of photoelectric probes mounted at the same edges of said images and sensitive respectively to the first and the second of said component colors, means connected between said probes for producing a potential dependent on unequal overlap of said images on said probes, and means responsive to said potential for registering said edges.

ALFRED N. GOLDSMITH.

REFERENCES CITED

The following references are of record in the file of this patent:

UNITED STATES PATENTS

| Number | Name | Date |
|---|---|---|
| 2,307,212 | Goldsmith | Jan. 5, 1943 |
| 2,415,059 | Zworykin | Jan. 28, 1947 |